(12) United States Patent
Schrand et al.

(10) Patent No.: US 6,789,657 B2
(45) Date of Patent: Sep. 14, 2004

(54) PRESSURE REGULATION OF SPEED SENSING ELECTRONIC LIMITED SLIP DIFFERENTIAL FOR AXLES

(75) Inventors: Edward V. Schrand, Farmington Hills, MI (US); Kurt B. Prescher, Brighton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/309,219

(22) Filed: Dec. 4, 2002

(65) Prior Publication Data

US 2004/0108180 A1 Jun. 10, 2004

(51) Int. Cl.[7] .......................................... F16D 25/0635
(52) U.S. Cl. .................. 192/85 A; 192/109 F
(58) Field of Search .................. 192/88 A, 85 A, 192/35, 109 F; 475/88, 89, 90

(56) References Cited

U.S. PATENT DOCUMENTS

| | | | |
|---|---|---|---|
| 5,299,986 A | * | 4/1994 | Fabris et al. .................. 475/88 |
| 5,964,126 A | * | 10/1999 | Okcuoglu ..................... 74/650 |
| 6,120,408 A | * | 9/2000 | Yates et al. .................. 475/231 |
| 6,183,387 B1 | | 2/2001 | Yoshioka |
| 6,283,885 B1 | | 9/2001 | Irwin |
| 6,342,022 B1 | | 1/2002 | Sturm |
| 6,413,182 B1 | | 7/2002 | Yates III et al. |

* cited by examiner

Primary Examiner—Saul Rodriguez
(74) Attorney, Agent, or Firm—Ralph E. Smith

(57) ABSTRACT

A clutch pack actuation system for compressing the annular clutch pack of a limited slip differential includes a pump which can provide a supply of pressurized fluid, an annular member provided between the pump and the annular clutch pack, and an annular piston which is slidable within the annular member. Together with the annular member, the annular piston defines a clutch pressure chamber adapted to receive the supply of pressurized fluid. A fluid return line, by which the pressurized fluid is discharged from the clutch pressure chamber, is provided, and a valve, through which the pressurized fluid is returned to a fluid reservoir, is disposed in the fluid return line. The valve includes an element which is electromagnetically actuated so as to produce a desired pressure in the clutch pressure chamber.

6 Claims, 2 Drawing Sheets

PRESSURE REGULATION OF SPEED SENSING ELECTRONIC LIMITED SLIP DIFFERENTIAL FOR AXLES

BACKGROUND OF THE INVENTION

1. Field of the Invention

The present invention relates to a device which actuates a clutch pack in a limited slip differential and which uses a pressure regulating solenoid valve to control torque across the differential.

2. Description of Related Art

In conventional limited slip differential systems, torque transfer is controlled by a fluid bleed-off orifice. This generates a torque versus shaft speed (rpm) curve for each orifice open area and fluid viscosity. Since the flow will change with each viscosity change, the viscosity must be accurately modeled.

Some systems use a position-controlled valve to control flow open area. U.S. Pat. No. 6,413,182 B1 to Yates III et al., for example, discloses a limited slip differential having a thermal compensating valve for regulating torque bias. In this differential, a clutch piston is provided with flow control orifices permitting a flow of fluid from a clutch pressure chamber to a flow return circuit leading to an axle housing serving as a fluid reservoir. A thermal compensating valve is mounted on the clutch piston and is operable to decrease the flow area of the orifices upon increasing temperature and to increase the flow area upon decreasing temperature.

U.S. Pat. No. 6,183,387 B1 to Yoshioka discloses a variable pressure relief system for a hydraulically actuated limited slip differential including an annular actuator ring which is movable to adjust a maximum pressure attainable in a rotatable gear case.

U.S. Pat. Nos. 6,283,885 B1 to Irwin and 6,342,022 B1 to Sturm disclose pressure relief valves for hydraulically actuated clutch packs in limited slip differential or torque coupling devices.

Each of the four patents referred to above is generally related to the subject matter of the present invention, and the entire disclosure of each of these four patents is incorporated into the present application by reference.

SUMMARY OF THE INVENTION

It is one object of the invention to provide an actuation system for a limited slip differential in which the need to model predicted fluid viscosity and the resulting pressure at the clutch pack piston to compensate for changes in pressure fluid temperature is eliminated It is another object of the invention to provide such an actuation system which improves regulation of output torque, permits removal of a thermocouple, and eliminates the need to develop viscosity curves.

According to the invention, these objects are achieved by way of a particular clutch pack actuation system which can compress the annular clutch pack of a limited slip differential. The system includes a pump which can provide a supply of pressurized fluid, an annular member provided between the pump and the annular clutch pack, and an annular piston which is slidable within the annular member. Together with the annular member, the annular piston defines a clutch pressure chamber adapted to receive the supply of pressurized fluid. A fluid return line, by which the pressurized fluid is discharged from the clutch pressure chamber, is provided, and a valve, through which the pressurized fluid is returned to a fluid reservoir, is disposed in the fluid return line. The valve includes an element which is electromagnetically actuated so as to produce a desired pressure in the clutch pressure chamber.

A process of regulating pressure in a clutch pressure chamber also forms part of the present invention.

By way of the invention, the differential does not require a thermocouple, and modeling of fluid viscosity is not required. In addition, torque transfer is more closely controlled, and regulating the differential preload is easier with a valve spring than by way of orifice size adjustment.

DETAILED DESCRIPTION OF THE INVENTION

Figure 1:
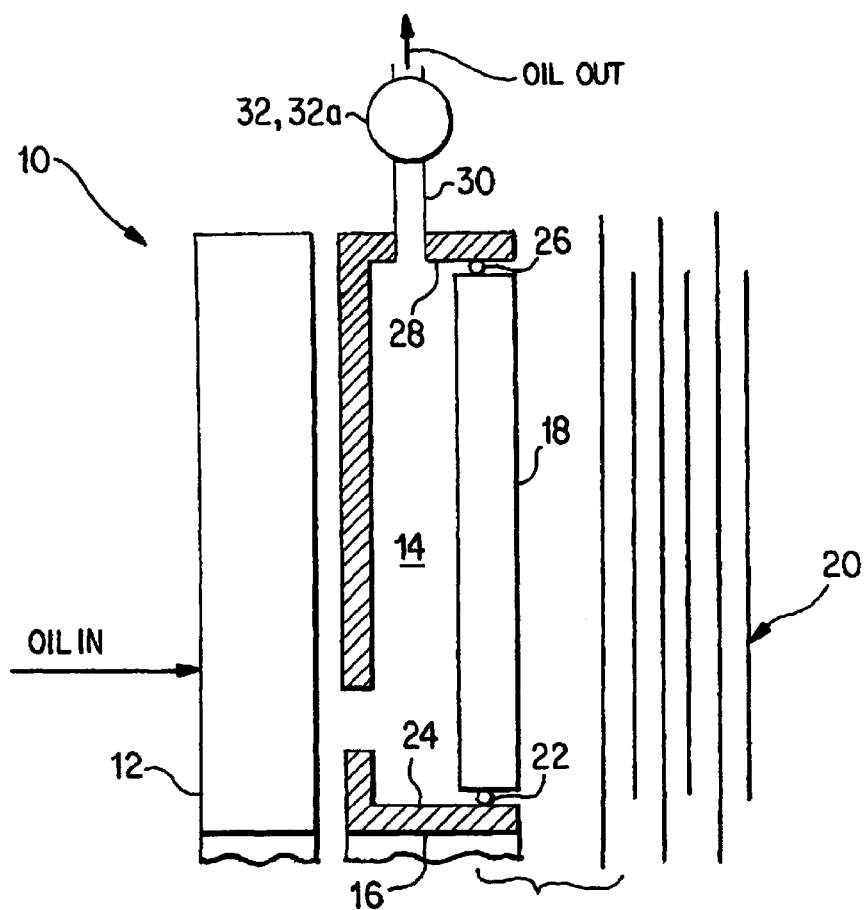
FIG. 1 is a schematic cross sectional illustration of a clutch pack actuation system.

The clutch pack actuation system 10 schematically illustrated in FIG. 1 includes a gerotor pump 12 operating in a known manner to supply pressurized fluid, such as oil, to a clutch pressure chamber 14. The gerotor pump has a configuration which is known in the art, and operates similarly to the positive-displacement pump of the Yates III et al. patent referred to above to supply fluid to the chamber 14. An annular cylinder member 16 within which the clutch pressure chamber is defined is located adjacent to the gerotor pump 12. An annular clutch piston 18 is slidably received within the annular cylinder member for movement towards an annular clutch pack 20 when fluid pressure in the clutch pressure chamber 14 increases and away from the annular clutch pack when fluid pressure in the clutch pressure chamber decreases. A first annular seal 22 is disposed between the piston 18 and a radially inner interior wall 24 of the annular cylinder member 16, and a second annular seal 26 is disposed between the piston 18 and a radially outer interior wall 28 of the cylinder member.

Discharge of pressurized fluid from the clutch pressure chamber 14 to a reservoir defined by the axle housing occurs by way of a fluid return line 30. A relief valve 32, 32a is disposed in the fluid return line 30 and controls discharge of pressurized fluid from the clutch pressure chamber 14.

The need to compensate for viscosity changes in pressurized fluid of a limited slip differential due to temperature variations is well recognized. As noted in the Yates III et al. patent, for example, viscosity change compensation is needed to avoid unpredictable handling in a rear wheel drive vehicle and a tendency to under-steer in a front wheel drive vehicle. As noted previously, in the Yates III et al. patent, adjustment for viscosity changes is provided by a thermal compensating valve controlling a flow-through orifice in an annular clutch piston.

Figure 2:
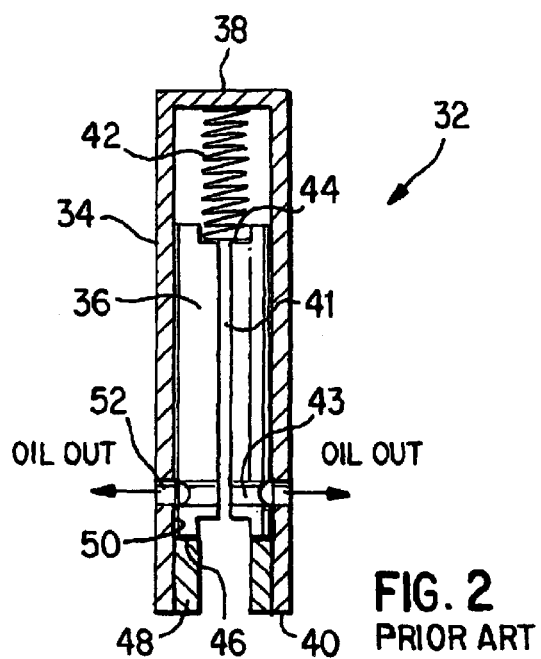
FIG. 2 is a partial cross sectional view of a known relief valve structure usable in the clutch pack actuation system shown in FIG. 1.

FIG. 2 of the present application shows one known relief valve construction usable in a limited slip differential incorporating the clutch pack actuation system schematically illustrated in FIG. 1 and providing compensation for changes in pressurized fluid viscosity. The known relief valve 32 shown in FIG. 2 includes a housing 34 in which a valve element 36 can reciprocate. The housing 34, which may be cylindrical, is closed off at a first end 38, and is open at a second opposite end 40. Referring again to FIG. 1, it will be understood that the fluid return line 30 leads to the second end 40 of the relief valve. The valve element 36 includes a longitudinal fluid passage 41 and a plurality of radial fluid passages 43 intersecting the longitudinal fluid passage 41, and has a diameter of a size which permits unencumbered movement back and forth within the housing 34. A spring 42 is interposed between the first end 38 of the housing 34 and a spring seat 44 on the valve element 36. The spring 42 biases the valve element 36 towards a seated position in which an end 46 of the valve element opposite the spring seat engages an abutment 48, such as an annular ring, secured to an inner wall 50 of the housing 34. The housing has lateral openings 52 defined therein which align with the radial fluid passages 43 when the end 46 of the valve element is seated against the abutment 48 and through which fluid can return to the fluid reservoir.

To provide for pressurized fluid viscosity change compensation, an energizable wire solenoid coil (not shown) is used to supply an adjustable force to the valve element 36 which moves the valve element against the biasing force of the spring 42. The end 46 of the valve element thus moves a selected distance away from the abutment 48. By adjusting the current supplied to the wire solenoid coil, the overlapping cross-sectional area of the radial passages 43 and the lateral openings 52 can be made larger or smaller to compensate for changes in pressurized fluid viscosity and provide for desired torque transfer.

Control of torque transfer by a fluid bleed-off orifice generates a torque versus shaft rotational speed (rpm) curve for each orifice open area and fluid viscosity. Since flow will change with each viscosity change, the viscosity must be accurately modeled. Systems such as that just described in connection with FIG. 2, which use a position controlled valve to control flow open area so as to compensate for viscosity changes, thus require extensive data storage and manipulation.

Figure 3:
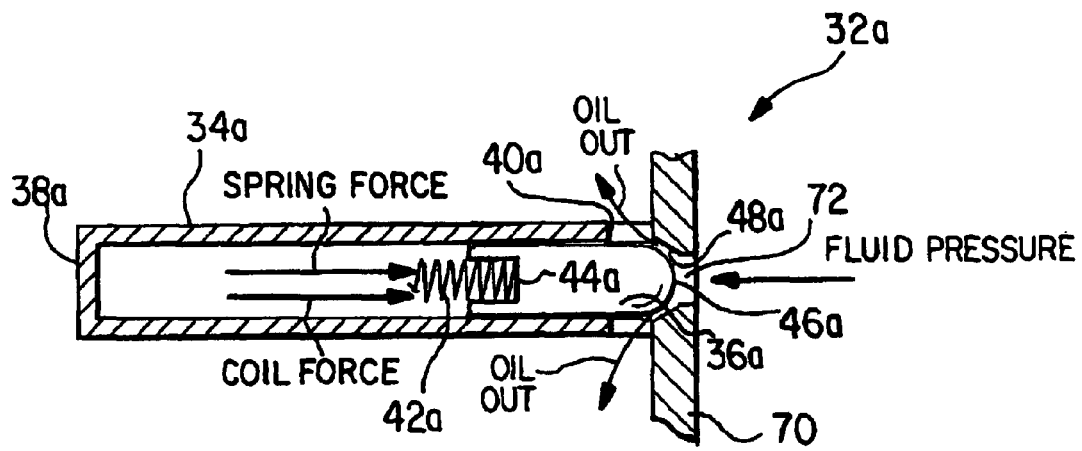
FIG. 3 is a partial cross sectional view of a pressure adjusting valve according to this invention which usable in the clutch pack actuation system shown in FIG. 1.

FIG. 3 illustrates a pressure adjusting valve which can be used according to the present invention instead of the flow open area regulating relief valve discussed in connection with FIG. 2. As with the valve illustrated in FIG. 2, the pressure adjusting valve 32a shown in FIG. 3 is appropriate for use in a limited slip differential incorporating the clutch pack actuation system 10 schematically illustrated in FIG. 1.

The pressure adjusting valve 32a shown in FIG. 3 is a normally closed, solenoid aided valve. This valve includes a housing 34a in which a valve element 36a can reciprocate. The housing 34a, which may be cylindrical, is vented and is open at its second opposite end. Lateral openings 40a are provided at the second end of the housing 34a. It will be understood that the fluid return line 30 shown in FIG. 1 leads to an opening in a partition, which will be described, that, in turn, leads to the second end of the housing 34a. The valve element 36a is solid and has a diameter of a size which permits unencumbered movement back and forth within the housing 34a. A preload spring 42a is interposed between the first end 38a of the housing 34a and a spring seat 44a on the valve element 36a. The spring 42a biases the valve element towards a seated position, in which a part spherical or similarly shaped end surface 46a of the valve element at a distal end of the valve element with respect to the spring seat 44a engages a recessed valve seat 48a in a partition or barrier 70. When the end surface 46a is displaced from the valve seat 48a, flow of hydraulic fluid between the end surface 46a and the recessed valve seat 48a is permitted.

In a manner similar to that of the known configuration shown in FIG. 2, an energizable wire solenoid coil (not shown) is used to supply an adjustable force to the valve element 36a. In contrast to the known configuration of FIG. 2, however, in the configuration shown in FIG. 3, energization of the wire solenoid coil is used to generate a "coil" force opposing the force produced by fluid pressure in the return line 30, i e. a "coil" force which is in the same direction rather than opposite to the valve element seating ("spring") force supplied by the preload spring 42a.

Various inputs, such as signals received from wheel speed sensors, can be used to estimate a desired pressure in the clutch pressure chamber 14. A lookup table is used to determine, from these inputs, the necessary current which must be supplied to the solenoid coil to produce the desired pressure in the clutch pressure chamber 14. The fluid pressure from the return line 30 is an input to the valve force balance. The preload pressure is controlled by the preload spring 42a, so when the pressure from the return line builds to a given pressure set point, fluid will leak through the orifice 72.

Figure 4:
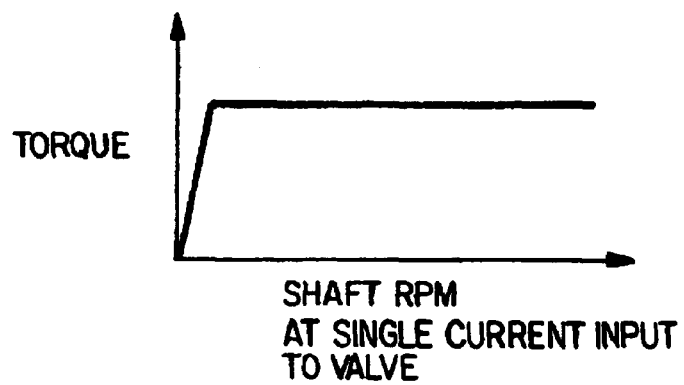
FIG. 4 is a torque versus shaft speed curve produced at a particular current input to the valve according to the present invention.

Utilizing a pressure regulating valve to control pressure in the pressure chamber 14 will yield a specific torque curve for each unique current setting. FIG. 4 shows one such torque curve. More specifically, FIG. 4 shows a biasing torque between left and right output shafts provided by compression of the clutch pack 20 as a function of shaft rpm for one unique current setting. Using a pressure adjusting or regulating valve to control pressure in the chamber 14 yields a specific torque curve for each current setting, and the need to model predicted fluid viscosity and the resulting pressure applied to the clutch piston 18 is eliminated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A clutch pack actuation system which can compress an annular clutch pack of a limited slip differential comprising:
   a pump which can provide a supply of pressurized fluid,
   an annular member provided between the pump and the annular clutch pack,
   an annular piston which is slidable within the annular member and which, together with the annular member, defines a clutch pressure chamber adapted to receive the supply of pressurized fluid,
   a fluid return line by which the pressurized fluid is discharged from the clutch pressure chamber, and
   a valve, through which the pressurized fluid is returned to a fluid reservoir, disposed in the fluid return line,
   wherein the valve includes an element which is electromagnetically actuated so as to produce a desired pressure in the clutch pressure chamber, and a force produced by electromagnetic actuation of the element opposes a force produced on the element by the pressurized fluid.

2. The clutch pack actuation system according to claim 1, wherein the element is preloaded towards a position in which flow of the pressurized fluid through the valve is prohibited.

3. The clutch pack actuation system according to claim 2, wherein said valve includes a housing and said element is movable within said housing.

4. The clutch pack actuation system according to claim 3, and further comprising a spring interposed between the housing and the element by which the element is preloaded.

5. A process of regulating pressure in a clutch pressure chamber of a clutch pack actuation system which can compress an annular clutch pack of a limited slip differential comprising:

providing an annular piston which is slidable within an annular member and which, together with the annular member, defines the clutch pressure chamber;

supplying pressurized fluid to the clutch pressure chamber, producing a desired pressure in said clutch pressure chamber by way of an electromagnetically actuated pressure regulating valve disposed in a fluid return line and through which the pressurized fluid is returned to a fluid reservoir; and producing a force by electromagnetic actuation of an element in the valve opposing a force produced on the element by the pressurized fluid.

6. The method of claim 5 further comprising preloading the element towards a position in which flow of the pressurized fluid through the valve is prohibited.

* * * * *